US008543986B2

(12) United States Patent
Murthy et al.

(10) Patent No.: US 8,543,986 B2
(45) Date of Patent: Sep. 24, 2013

(54) METHODS AND SYSTEMS FOR TEST AUTOMATION OF FORMS IN WEB APPLICATIONS

(75) Inventors: Praveen K. Murthy, Fremont, CA (US); Fangqi Sun, Davis, CA (US); Mukul Ranjan Prasad, San Jose, CA (US); Sreeranga P. Rajan, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 413 days.

(21) Appl. No.: 12/832,131

(22) Filed: Jul. 8, 2010

(65) Prior Publication Data
US 2012/0011489 A1    Jan. 12, 2012

(51) Int. Cl.
*G06F 9/44* (2006.01)
(52) U.S. Cl.
USPC .................. 717/126; 717/124; 717/131
(58) Field of Classification Search
None
See application file for complete search history.

(56) References Cited

U.S. PATENT DOCUMENTS

| 6,915,454 | B1* | 7/2005 | Moore et al. | 717/124 |
| 7,328,428 | B2* | 2/2008 | Baugher | 717/124 |
| 8,145,751 | B2* | 3/2012 | Creamer et al. | 717/131 |
| 8,271,953 | B2* | 9/2012 | Prasad et al. | 717/126 |
| 8,291,387 | B2* | 10/2012 | Pal et al. | 717/126 |
| 8,336,102 | B2* | 12/2012 | Neystadt et al. | 717/124 |
| 8,347,267 | B2* | 1/2013 | Givoni et al. | 717/131 |
| 8,347,392 | B2* | 1/2013 | Chess et al. | 717/131 |
| 8,359,576 | B2* | 1/2013 | Prasad et al. | 717/124 |
| 2002/0083068 | A1* | 6/2002 | Quass et al. | 707/100 |
| 2005/0257198 | A1* | 11/2005 | Stienhans et al. | 717/124 |
| 2008/0120722 | A1* | 5/2008 | Sima et al. | 726/25 |
| 2009/0089759 | A1* | 4/2009 | Rajan et al. | 717/126 |
| 2009/0100345 | A1* | 4/2009 | Miller | 715/738 |
| 2010/0125832 | A1* | 5/2010 | Prasad et al. | 717/124 |
| 2012/0017200 | A1* | 1/2012 | Ghosh et al. | 717/126 |
| 2012/0216177 | A1* | 8/2012 | Fink et al. | 717/131 |
| 2012/0297372 | A1* | 11/2012 | Berg et al. | 717/131 |

FOREIGN PATENT DOCUMENTS
EP        1923802        5/2008

OTHER PUBLICATIONS

Kiezun, Adam. Effective Software Testing with String-Constraint Solver. Submitted to the Department of Electrical Engineering and Computer at the Massachusetts Institute of Technology Jun. 2009. [retrieved on Jul. 18, 2012] Retrieve from InternetL: <URL: http://people.csail.mit.edu/akiezun/KiezunThesis.pdf>.*

(Continued)

*Primary Examiner* — Thuy Dao
*Assistant Examiner* — Ravi K Sinha
(74) *Attorney, Agent, or Firm* — Baker Botts L.L.P.

(57) ABSTRACT

A method includes accessing a page of Web application that includes an interactive form having at least one field for entry of data, the interactive form rendered by the Web application based on code for the interactive form. The method also includes extracting input validation code from the code, the input validation code including at least one constraint on data entered into the at least one field. The method additionally includes extracting the at least one constraint based on an analysis of the input validation code and solving, for the at least one field, for a string value based at least on the at least one constraint for the at least one field. The also includes automatically entering, into the at least one field, the string value. The method additionally includes automatically submitting the interactive form, including the string value entered into the at least one field.

16 Claims, 4 Drawing Sheets

(56) References Cited

OTHER PUBLICATIONS

Chandra, Satish, Fink, Stephen J., Sridharan, Manu. Snugglebug: A Powerful Approach to Weakest Preconditions. ACM SIGPLAN Notices—PLDI '09 [online], Jun. 2009 [retrieved on Jul. 23, 2012]. Retrieved from Internet: <URL: http://doi.acm.org/10.1145/1543135.1542517>.*

Hooimeijer, Pieter and Neanes, Margus. An Evaluation of Automata Algorithms for String Analysis. Twelfth International Conference on Verification, Model Checking, and Abstract Interpretation [online], Jan. 23-25, 2011 [retrieved on Jul. 19, 2012]. Retrieved from Internet: <URL: http://research.microsoft.com/pubs/133121/msr-tr-2010-90.pdf>.*

Saxena, P. Akhawe, D. Hanna, S. Mao, F. McCamant, S. and Song, D.; A Symbolic Execution Framework for JavaScript. Technical Report No. UCB/EECS-2010-26. [online] Published Mar. 8, 2010. [retrieved on Jul. 23, 2012]. Retrieved from the Internet: <URL:// http://www.eecs.berkeley.edu/Pubs/TechRpts/2010/EECS-2010-26.pdf>.*

Kaiser, Shirley; The Ultimate Testing Checklist. Server Side Essentials [online] Jul. 26, 2006, [retrieved Jul. 18, 2012]. Retrieved from Internet: <URL: http://www.sitepoint.com/ultimate-testing-checklist/>.*

Jane Huffman hayes and Jeff Offutt, Input Validation Analysis and Testing, [Online] Oct. 27, 2006, [Retrieved from the Internet] <http://link.springer.com/content/pdf/10.1007/02Fs10664-006-9025-1.pdf> 30 pages.*

Buehrer, G; Weide, B; Sivilotti, P., Using Parse Tree Validation to Prevent SQL Injection Attacks, [Online] 2005, [Retrieved from the Internet] <http://delivery.acm.org/10.1145/1110000/1108496/p106-buehrer.pdf> pp. 106-113.*

Brabrand, C.; Moller, A.; Ricky, M.; Schwartzbach, M.; PowerForms: Declarative Client-side Form Field Validation, [Online] 2000, [Retrieved from the Internet] <http://link.springer.com/content/pdf/10.1023%2FA%3A1018772405468.pdf> pp. 205-214.*

Li, N.; Xie; Jin, M. Liu, C. Perturbation-based user-input-validation testing of web applications, [Online] Nov. 2010, [Retrieved from the Internet] <http://www.sciencedirect.com/science/article/pii/S0164121210001780> pp. 2263-2274.*

European Search Report; Application No. 11171234.5; pp. 8, Dec. 28, 2011.

Wikipedia; "Predicate transformer semantics"; www.wikipedia.org ; pp. 6, Jun. 29, 2010.

Chandra et al.; "Snugglebug: A Powerful Approach to Weakest Preconditions"; PLDI 09; pp. 12, 2009.

Extended European Search Report; Application No. 11171234.5-2212 / 2413259; pp. 13, Jun. 6, 2012.

Saxena et al.; "A Symbolic Execution Framework for JavaScript"; Berkeley, California; www.eecs.berkeley.edu; pp. 20, Mar. 8, 2010.

* cited by examiner

```
function validateUsername (fld) {
    var error = " " ;
    var illegalChars = /\W/ ;  //  allow letters, numbers, and
underscores if (fld.value == " ") {
        fld.style.background = 'Yellow' ;
        error = "You didn't enter a username. \n" ;
    } else if ( (fld.value.length < 5)  ||  (fld.value.length >
15) ) {
        fld.style.background = 'Yellow' ;
        error = "The username is the wrong length. \n" ;
    } else if (illegalChars.test (fld.value) ) {
        fld.style.background = 'Yellow' ;
        error = "The username contains illegal characters. \n" ;
    } else {
        fld.style.background = 'White' ;
    }
    return error;
}
```

*FIG. 3*

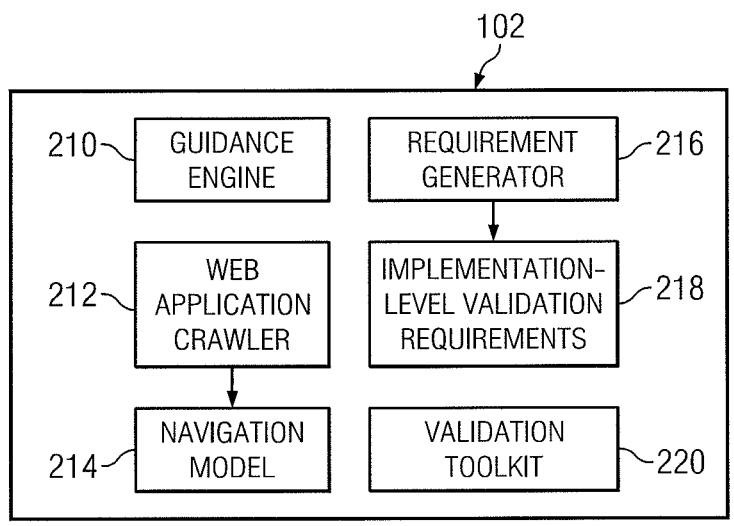

*FIG. 4*

METHODS AND SYSTEMS FOR TEST AUTOMATION OF FORMS IN WEB APPLICATIONS

TECHNICAL FIELD

This disclosure relates generally to validating Web applications.

BACKGROUND

With computer-based applications in high demand, and particularly Web applications designed for use in connection with the World Wide Web, the importance of the quality assurance process is ever-increasing. Applications, and Web applications in particular, are difficult to test because the set of all possible user inputs allowed by the interface of an application can be very large. Previously known methods of validating Web applications specify checks on Web application artifacts, such as, for example, screens, buttons, links, and form fields by directly referring to the underlying implementation of the artifact. This typically requires some knowledge of the underlying implementation of the Web application. In contrast, system-level (end-to-end) Web application test engineers, who do not have knowledge about the underlying implementation of the Web application, typically manually exercise use-case test scenarios on a Web application, one by one, by visually observing artifacts presented with the deployed Web application and "firing" events at these artifacts. As an example, firing events at artifacts may include clicking, as for example with a mouse or other input device, on buttons and links, or entering data into forms displayed in a user interface, such as a Web browser displaying a rendered instance of the Web application. Recent advances have overcome the need for manual testing of certain artifacts, including buttons, links and forms.

However, with respect to forms in a Web application, the problem of automating testing of an application is further complicated by the fact that complex input validation code may exist in the Web application that checks the entered data to ensure that it matches certain constraints. Traditional approaches to automated testing do not take into account such constraints, thereby limiting test coverage. For instance, a constraint for a username may be that the username must be of a length between 6 and 15 characters, must not contain non-alphanumeric characters, must have at least one capital letter, and at least one number.

BRIEF DESCRIPTION OF THE DRAWINGS

FIG. 3 illustrates an example code segment for validating a field entry, in accordance with embodiments of the present disclosure.

FIG. 4 illustrates an example system for validating Web applications, in accordance with the present disclosure.

DESCRIPTION OF EXAMPLE EMBODIMENTS

Particular embodiments relate to validating Web applications, and particularly, Web 2.0 applications. Web 2.0 applications may generally refer to dynamic or interactive Web applications that use asynchronous communication mechanisms with the server so that the entire page and information does not have to be reloaded and communicated every time. This facilitates interactive information sharing, interoperability, user-centered design, or collaboration via the World Wide Web or other suitable or appropriate network environment. Web applications, and Web 2.0 applications in particular, often take the form of, utilize, or are characterized by a number of widgets within the window of the browser. A widget may generally refer to a stand-alone application or portable chunk of code that can be installed and executed within a separate renderable structured document, such as, for example, a Hyper Text Markup Language (HTML)-based web page, or otherwise embedded into a third party site by a user on a page where such user has rights of authorship (e.g. a webpage, blog, or profile on a social media site). Examples of Web 2.0 applications may operate in conjunction with Web-based communities, hosted services, social-networking sites, video-sharing sites, or wikis, among other possibilities.

Particular embodiments relate to automatically extracting input validation code for form fields of a Web application, analyzing the input validation code using static analysis techniques, extracting constraints that field variables must satisfy, use a symbolic string solver to solve for values for each field that satisfy the constraints, and automatically enter a string into the field for that satisfies the input constraints.

Figure 1:
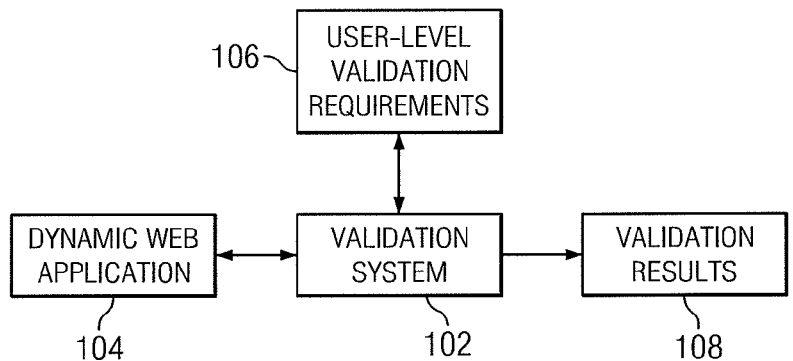
FIG. 1 illustrates an example environment of an example system for validating Web applications, in accordance with embodiments of the present disclosure.

FIG. 1 illustrates an example environment 100 of an example validation system 102. Validation system 102 may include one or more hardware components, one or more software components, or a combination of hardware and software components. Components of validation system 102 may execute or operate within one or more computer systems, such as those described in more detail below with reference to FIG. 7. Validation system 102 is configured to access Web application 104. In particular embodiments, Web application 104 is deployed, at least in part, at the same computer system(s) as validation system 102. In an alternate embodiment, Web application 104 may be deployed at one or more separate computer systems that are connected or coupled either directly or indirectly with the computer system(s) hosting validation system 102. Web application 104 may also be hosted, at least in part, at one or more external or third party servers or computing systems.

Generally, a Web application is an application that may be accessed via a Web browser (e.g., MICROSOFT WINDOWS INTERNET EXPLORER, MOZILLA FIREFOX, APPLE SAFARI, GOOGLE CHROME, or OPERA) or other client application over a network, or a computer software application that is coded in a Web browser-supported language and sometimes reliant on a Web browser to render the application executable. Web applications have gained popularity largely as a result of the ubiquity of Web browsers, the convenience of using a Web browser launched at a remote computing device as a client (sometimes referred to as a thin client), and the corresponding ability to update and maintain Web applications without necessarily distributing and installing software on remote clients. Often, to implement a Web application, the Web application requires access to one or more resources provided at a backend server of an associated Website. Additionally, Web applications may often require access to additional resources associated with other applications.

A Web application deployed with or at an end-user's machine (client device) may cause a Web page to be rendered on a display of the end-user's machine. Web applications that execute in conjunction with or in the context of a Web browser may cause the Web browser to render a Web page on the display. Web pages of Web applications typically include embedded links to other Web pages of the Web application as well as to Web pages and Websites external to or not affiliated with the Web application. Dynamic Web applications in particular often include a plurality of embedded links which may be rendered on the currently viewed Web page as a hyperlink, icon, or other "clickable" feature. Typical dynamic Web applications may include a plurality of resources located at the server(s) hosting the Web applications or retrieved from external third party servers. A Web page or resource for rendering a Web page, which may themselves include multiple embedded resources, may include data records, such as content plain textual information, or more complex digitally encoded multimedia content, such as software programs or other code objects, graphics, images, audio signals, videos, and so forth. One prevalent markup language for creating Web pages is the Hypertext Markup Language (HTML). Other common Web browser-supported languages and technologies include the Extensible Markup Language (XML), the Extensible Hypertext Markup Language (XHTML), JavaScript, Cascading Style Sheet (CSS), and JAVA, among others. By way of example, HTML enables an application or Web page developer to create a structured document by denoting structural semantics for text and links, as well as images, Web applications and other objects (e.g., form fields) that can be embedded within the page. Generally, a Web page may be delivered to a client as a static structured document, however, through the use of Web elements embedded in the page (e.g., executable JavaScript code segments), an interactive experience may be achieved with the page or a sequence of pages. During a user session at the client device, the Web browser interprets and displays the pages and associated resources received or retrieved from the Web application or Website hosting the Web page, as well as, potentially, resources from other Websites. By way of example, upon receipt of an HTML structured document by a Web browser, the Web browser may execute embedded calls including JavaScript code segments, which then call or request resources from third party hosts or Websites.

In particular embodiments, validation system 102 is configured to access Web application 104 over a network, such as, for example, an intranet, an extranet, a virtual private network (VPN), a local area network (LAN), a wireless LAN (WLAN), a wide area network (WAN), a metropolitan area network (MAN), a portion of the World Wide Web (Internet), or another network or combination of two or more such networks. The present disclosure contemplates any suitable network through which Web application 104 may be deployed in conjunction with validation system 102. In particular embodiments, validation system 102 initiates a session with one or more servers hosting Web application 104 by transmitting a request for Web application 104 to these hosting servers, such as, for example, in the form of an HTTP request. In particular embodiments, in response to receiving the request, the server hosting Web application 104 proceeds to generate a renderable implementation of Web application 104 in the form of an HTML or other structured document including structured document code and the content to be displayed as well as any embedded resources, or embedded calls and identifiers for the resources, for rendering the web page at or by validation system 102.

Figure 2:
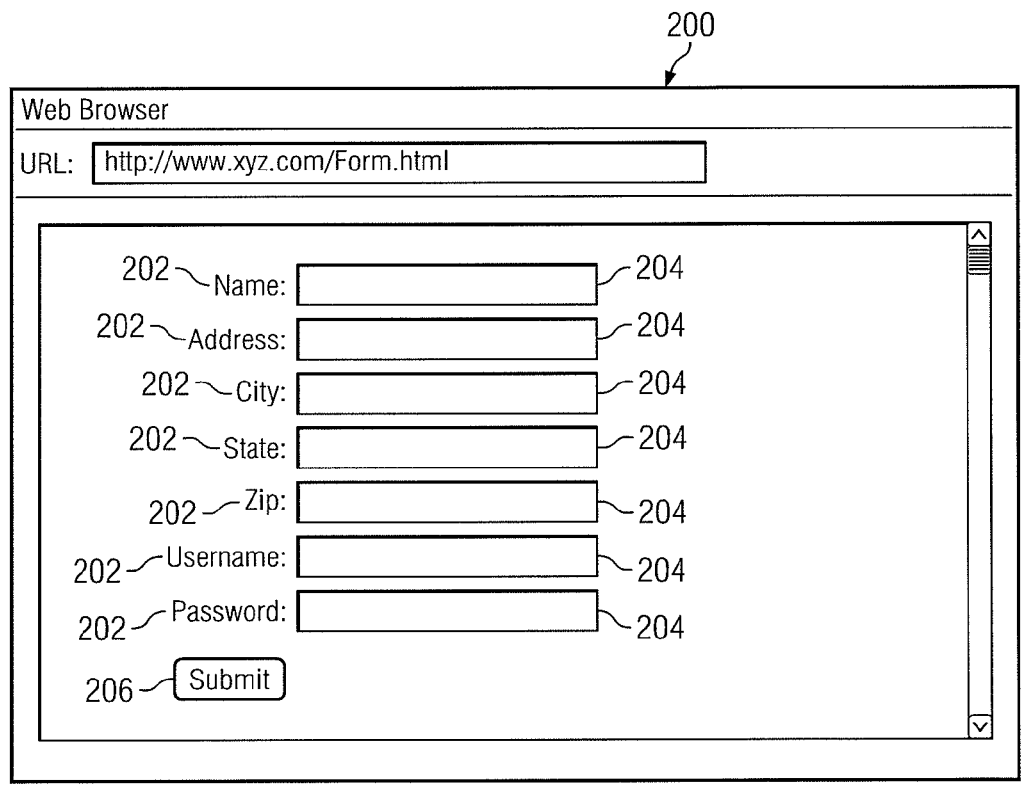
FIG. 2 illustrates an example Web browser display including an example interactive form, in accordance with embodiments of the present disclosure.

Often, a Web browser may read JavaScript code segments (or other suitable code) related to the display of interactive form fields, and may render and display interactive form fields based on such code segments. An example of such an interactive form displayed in a Web browser window is depicted in FIG. 2. As shown in FIG. 2, a Web browser window 200 may display a form including static strings 202, fields 204 and a submit button 206. Static strings 202 may include text displayed to a user of a Web browser to indicate the type of data the user is to enter into an adjacent field 204. Each field 204 may be a user interface element that allows a user of the Web browser to enter data into such field 204 (e.g., by use of a keyboard). After entering data into fields 204, a user may click on submit button 206 (or perform another action indicative of the user's desire to submit data), and the Web browser may then communicate such data to a server (e.g., server(s) hosting the Web applications). In some instances, the interactive form code may also include client-side validation code that places constraints on the data entered in fields 204. For example, a constraint may place a limit on the minimum and maximum length of a field associated with username and/or place limits on the types of characters that may be entered into the field. As another example, a field associated with a zip code may be limited to a five-digit numerical value. An example of such client-side validation code for a username field is depicted in FIG. 3. The example code of FIG. 3 constrains the length of a username to between 5 and 15 characters, and constrains the username from including characters other than letters, numbers and underscores.

In particular embodiments, validation system 102 further has access to user-level validation requirements 106 for use in validating Web application 104. In particular embodiments, user-level validation requirements 106 include natural language references to various web artifacts of Web application 104, rather than implementation-level details of these Web artifacts. In particular embodiments, a validation requirement 106 may be a test case for Web application 104. A test case may include a typical scenario of exercising Web application 104, such as a specific sequence of steps performed by a user of the Web application, as well as some explicit or implicit specification of what constitutes correct or valid behavior of the Web application under the scenario. Simply put, a test case may be considered a use case in combination with a correctness check (e.g., an expected result or outcome). In other embodiments, a validation requirement 106 may be a more expressive representation of the expected behavior of Web application 104, and written in a formalism such as, for example, temporal logic. Validation results 108 are output from validation system 102 as a result of validating one or more validation requirements 106 or other test or use cases on Web application 104.

As illustrated more particularly in FIG. 4, validation system 102 may include guidance engine 210, Web application crawler 212, requirement generator 216, and validation toolkit 220. In particular embodiments, with the aid of guidance engine 210, crawler 212 accesses and crawls Web application 104 and outputs a navigation model 214. In particular embodiments, requirement generator 216 generates implementation-level validation requirements 218 based at least in part on user-level validation requirements 106; that is, requirement generator 216 may take as input property or test case expressions expressed in a natural language representation as described herein and generate computer- or machine-readable instructions (implementation-level validation requirements 218) that are input to validation toolkit 220, which is configured to read the computer-readable validation requirements 218. In particular embodiments, validation toolkit 220 is configured to validate Web application 104 using navigation model 214 in conjunction with implementation-level validation requirements 218 and, subsequently, output validation results 108. More particularly, validation toolkit 220 may be configured to take as input navigation model 214 and implementation-level validation requirements 218 and check validation requirements 218 against navigation model 214 to validate Web application 104. For example, validation results 108 may include one or more results, tables, or graphs, stored in a memory of validation system 102 or elsewhere, and which provide an objective evaluation of Web application 104, including whether or not each of the validation requirements 218 were satisfied or more generally whether one or more navigational or business logic properties or requirements were satisfied. Additionally, in some embodiments, requirement generator 216 may take as input natural language mappings of Web artifacts as described herein, generate use or test cases in the form of natural language representation expressions as described herein using the mappings of the Web artifacts, and then generate implementation-level validation requirements 218 based on the generated expressions.

Figure 5:
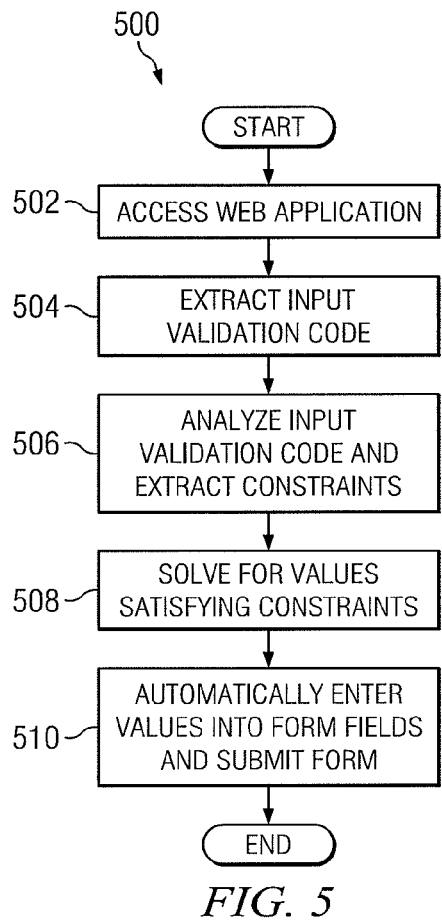
FIG. 5 illustrates a flowchart illustrating an example method for validating Web applications, in accordance with the present disclosure.

FIG. 5 illustrates a flowchart of an example method 500 for automatically entering values into an interactive form of Web application 104 by validation system 102. Method 500 may generally begin at 502 with Web application crawler 212 accessing Web application 104. Web application crawler 212 may accessing Web application 104 by reading code (e.g., JavaScript, HTML, etc.) for the Web application. At step 504, as crawler 212 accesses a particular page of Web application 104 that includes an interactive form, crawler 212 may extract input validation code from the Web application 104 (e.g., client-side validation code such as that depicted in FIG. 3).

Figure 6:
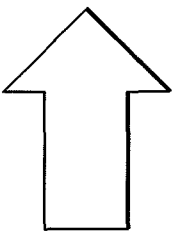
FIG. 6 illustrates an example of constraints for a username that may be extracted from the input validation code depicted in FIG. 3.

After or concurrently with step 504, method 500 may proceed to step 506 in which crawler 212 may analyze the extracted input validation code and extract constraints for the various form fields. Crawler 212 may extract constraints by performing a "backwards" static analysis whereby analysis begins at a statement in the code related to the submission of form data (e.g., "form submit" statement, "on-click" statement, etc.) and traverses the code backwards to collect constraints for each variable that must be satisfied in order for the form data to be successfully submitted. The extraction of constraints may be based on a control flow graph construction of the input validation code. Alternatively or in addition, the extraction may be based on a symbolic analysis of the code with the weakest preconditions, in order to provide the maximum set of behaviors that would satisfy the constraints. FIG. 6 illustrates an example of constraints for a username that may be extracted from the input validation code depicted in FIG. 3.

After or concurrently with steps 504 and 506, method 500 may proceed to step 508 in which crawler 212 may generate string values satisfying the extracted constraints. In some embodiments, crawler 212 may include a symbolic string solver to generate for string values satisfying the extracted constraints. In such embodiments, the string solver may use the extracted constraints as automata in the solver.

After or concurrently with steps 504, 506 and 508, method 500 may proceed to step 510 in which crawler 212 may automatically enter such generated strong values into appropriate field of an interactive form of Web application 104 and submit the form.

Advantageously, the methods and systems described above enable validation systems for Web applications to automatically enter form data, thus relieving the necessity of human intervention for entering compliant form data. In addition, the methods and systems described above may have numerous applications, including without limitation the use cases discussed below.

For example, the methods and systems described above may be used to ensure that a server to which form data is communicated implements the same checks as client-side verification code. Such consistency verification may be performed by disabling client-side verification (e.g., by disabling Javascript for Javascript-based forms, by using programs configured to pass Hypertext Transfer Protocol requests directly to a server, etc.) and passing to the server data that passes the input validation restraints, as well as data that violates such restraints. The string solver of crawler 212 may provide data that violates input validation constraints by generating strings based on negation of one or more of the constraints (e.g., if a constraint requires a string length between 5 and 15 characters, the string solver may generate a string less than 5 characters and/or more than 15 characters in order to provide data violating the constraint).

As another example, the methods and system described above may be used to simulate attacks on a server. To illustrate, attack vectors may be represented as constraints in the string solver such that the string solver generates strings to be automatically input to the form fields that simulate an attack. Such an attack vector may be a static string (e.g., "script>alert( )</script>") or parameterized such as the following string, for example:

"<script>"+"alert("+*+")"+"</script>"

Such parameterized attacks may allow for attack vectors of varying lengths that may otherwise meet other constraints for a field (e.g., string length, allowed characters, etc.). Thus, attack vectors may be targeted to fields in which the attack may be accepted by the Web application on the client side, rather than randomly attempting attacks that may be rejected due to other field input constraints. For example, constraints for a username field may not permit any attack, thus there may be no point in randomly trying attacks on such field. Another advantage may be that the search space in which attacks must be constructed may be narrowed.

As yet another example, the methods and systems described above may be used to check the whether the intent of the input validation code is implemented. To illustrate, if there is a specification of an intent for the input validation code, then validation system 102 may determine whether the input validation code actually achieves the intended object. As a specific example, suppose an intention of input validation code is to only allow "chat.com" in a uniform resource locator (URL). Suppose further that as implemented, the input validation code only checks for the string "chat" in a URL, thus allowing "evilchat" to pass the constraint and be communicated to the server. Such inconsistencies between implementation and intent may be detected by constructing a constraint automaton for a variable extracted from the input validation code, constructing an automaton for the intended property, and comparing to see if the automata are the same. If the automata are the same, then the validation code achieves the intended object.

Figure 7:
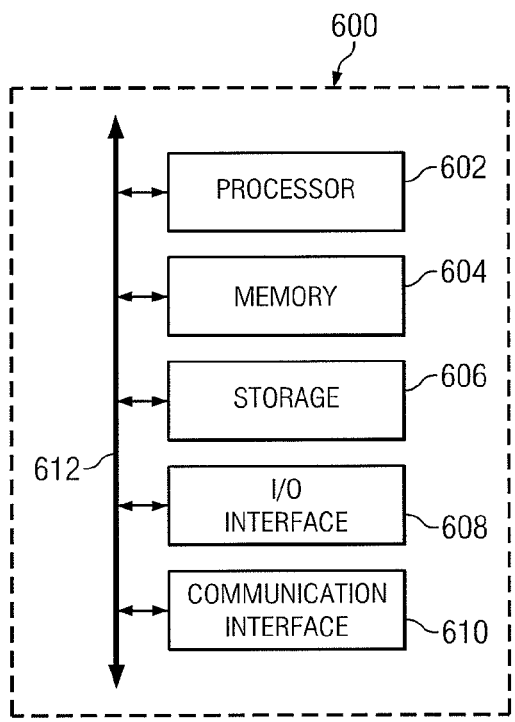
FIG. 7 illustrates an example computer system, in accordance with the present disclosure.

FIG. 7 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:
1. A method comprising:
   accessing a particular page of Web application that includes an interactive form having at least one field for entry of data by a user of the Web application, the inter- active form rendered by the Web application based on code for the interactive form;
extracting input validation code from the code, the input validation code including at least one constraint on data entered into the at least one field;
extracting the at least one constraint based on an analysis of the input validation code, wherein extracting the at least one constraint is based on a symbolic analysis of the input validation code applying weakest preconditions and comprises:
searching the code for the interactive form for a statement related to submission of form data; and
traversing the code backwards from the statement to collect the at least one constraint;
solving, for the at least one field, for a string value based at least on the at least one constraint for the at least one field;
automatically entering, into the at least one field, the string value; and
automatically submitting the interactive form, including the string value entered into the at least one field.

2. A method according to claim 1, wherein the input validation code includes client-side validation code.

3. A method according to claim 1, wherein the code for the interactive form includes JavaScript code.

4. A method according to claim 1, wherein solving includes solving the string value using a symbolic string solver.

5. A method according to claim 4, wherein the at least one constraint is used as an automaton in the symbolic string solver.

6. A method according to claim 1, further comprising:
constructing a first automaton for the at least one constraint;
constructing a second automaton based on an intent of the at least one constraint; and
comparing the first automaton to the second automaton to determine if the at least one constraint implements the intent.

7. A method according to claim 1, wherein solving for the string value comprises generating the string value such that it fails at least one of the one or more constraints, the method further comprising communicating the string value to a server to determine if the server implements the one or more constraints.

8. A method according to claim 1, further comprising:
providing a parameterized attack vector, the parameterized attack vector including a parameterized string that simulates an attack, and wherein solving for the string value comprises generating the string value such that it satisfies the one or more constraints and satisfies conditions of the parameterized string; and
determining whether submission of the string value is permitted by the Web application.

9. One or more computer-readable storage media encoding software that is operable when executed to:
access a particular page of Web application that includes an interactive form having at least one field for entry of data by a user of the Web application, the interactive form rendered by the Web application based on code for the interactive form;
extract input validation code from the code, the input validation code including at least one constraint on data entered into the at least one field;
extract the at least one constraint based on an analysis of the input validation code, wherein extracting the at least one constraint is based on a symbolic analysis of the input validation code applying weakest preconditions and comprises:
searching the code for the interactive form for a statement related to submission of form data; and
traversing the code backwards from the statement to collect the at least one constraint;
solve, for the at least one field, for a string value based at least on the at least one constraint for the at least one field;
automatically enter, into the at least one field, the string value; and
automatically submit the interactive form, including the string value entered into the at least one field.

10. Media according to claim 9, wherein the input validation code includes client-side validation code.

11. Media according to claim 9, wherein the code for the interactive form includes JavaScript code.

12. Media according to claim 9, wherein the software is operable to, when executed, solve the string value by using a symbolic string solver.

13. Media according to claim 12, wherein the at least one constraint is used as an automaton in the symbolic string solver.

14. Media according to claim 9, further comprising the software operable to, when executed:
construct a first automaton for the at least one constraint;
construct a second automaton based on an intent of the at least one constraint; and
compare the first automaton to the second automaton to determine if the at least one constraint implements the intent.

15. Media according to claim 9, wherein the software is operable to, when executed, in order to solve for the string value, generate the string value such that it fails at least one of the one or more constraints, wherein the software is further operable to communicate the string value to a server to determine if the server implements the one or more constraints.

16. Media according to claim 9, wherein the software is further operable to, when executed:
provide a parameterized attack vector, the parameterized attack vector including a parameterized string that simulates an attack, and wherein solving for the string value comprises generating the string value such that it satisfies the one or more constraints and satisfies conditions of the parameterized string; and
determine whether submission of the string value is permitted by the Web application.

* * * * *